(12) United States Patent
Hasholzner et al.

(10) Patent No.: US 11,032,775 B2
(45) Date of Patent: Jun. 8, 2021

(54) POWER SAVING HOST-MODEM INTERACTION IN A COMMUNICATION DEVICE

(71) Applicant: Intel IP Corporation, Santa Clara, CA (US)

(72) Inventors: Ralph Hasholzner, Munich (DE); Ajay Gupta, Portland, OR (US); Maruti Gupta Hyde, Portland, OR (US); Johannes Brendel, Erlangen (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/776,803

(22) PCT Filed: Dec. 22, 2015

(86) PCT No.: PCT/US2015/067254
§ 371 (c)(1),
(2) Date: May 17, 2018

(87) PCT Pub. No.: WO2017/111934
PCT Pub. Date: Jun. 29, 2017

(65) Prior Publication Data
US 2018/0376415 A1    Dec. 27, 2018

(51) Int. Cl.
*H04W 52/02* (2009.01)
*G06F 1/3234* (2019.01)
*G06F 13/14* (2006.01)

(52) U.S. Cl.
CPC ........ *H04W 52/028* (2013.01); *G06F 1/3278* (2013.01); *G06F 13/14* (2013.01);
(Continued)

(58) Field of Classification Search
None
See application file for complete search history.

(56) References Cited

U.S. PATENT DOCUMENTS 5,041,964 A    8/1991   Cole et al.
5,309,562 A    5/1994   Li
(Continued)

FOREIGN PATENT DOCUMENTS

CN    1050451 A    4/1991
CN    1550085 A    11/2004
(Continued)

OTHER PUBLICATIONS

"Translation of Chinese First Office Action", Chinese Application No. 201580084756.1, dated Dec. 2, 2020, Google translation, 24 pages.*

(Continued)

*Primary Examiner* — Bunjob Jaroenchonwanit
(74) *Attorney, Agent, or Firm* — Viering, Jentschura & Partner MBB

(57) ABSTRACT

Communication devices and methods of data communication are herein disclosed. In some aspects, a communication device may include a host and a modem interconnected by an interface. The host includes a host processor configured to control components of the communication device and to communicate with the modem via the interface. The modem includes a modem processor configured to control components of the modem and to communicate with the host via the interface. The modem processor is further configured to communicate information on a reduced activity state and a time remaining until a next event of the modem to the host processor. The host processor is further configured to reduce an operation of at least one component of the communication device based on receipt of the information on the reduced activity state of the modem and the time remaining until the next event of the modem.

24 Claims, 3 Drawing Sheets

(52) U.S. Cl.
CPC ... *H04W 52/0229* (2013.01); *H04W 52/0251* (2013.01); *Y02D 10/00* (2018.01); *Y02D 30/70* (2020.08)

(56) References Cited

U.S. PATENT DOCUMENTS

| | | | |
|---|---|---|---|
| 6,199,134 B1* | 3/2001 | Deschepper | G06F 1/3203 |
| | | | 710/311 |
| 7,912,518 B2 | 3/2011 | Uh et al. | |
| 8,359,071 B2 | 1/2013 | Basaralu | |
| 8,370,662 B2 | 2/2013 | Kim | |
| 2001/0052044 A1* | 12/2001 | Hsu | G06F 1/3209 |
| | | | 710/260 |
| 2002/0106997 A1* | 8/2002 | Barber | H04W 52/0229 |
| | | | 455/343.1 |
| 2003/0023720 A1 | 1/2003 | Wodzianek | |
| 2007/0140199 A1 | 6/2007 | Zhao et al. | |
| 2008/0307240 A1 | 12/2008 | Dahan et al. | |
| 2009/0055671 A1* | 2/2009 | Kim | H04W 52/0225 |
| | | | 713/323 |
| 2009/0111524 A1* | 4/2009 | Basaralu | G06F 1/3209 |
| | | | 455/559 |
| 2009/0201892 A1* | 8/2009 | Guiriec | G10L 19/012 |
| | | | 370/337 |
| 2011/0124375 A1 | 5/2011 | Stuivenwold | |
| 2012/0173901 A1 | 7/2012 | Soliman et al. | |
| 2014/0106747 A1* | 4/2014 | Josso | H04W 88/06 |
| | | | 455/435.2 |
| 2014/0192693 A1* | 7/2014 | Lee | H04W 52/0229 |
| | | | 370/311 |
| 2014/0219247 A1* | 8/2014 | Lee | H04W 92/02 |
| | | | 370/331 |
| 2015/0223285 A1 | 8/2015 | Ljung et al. | |
| 2016/0037578 A1* | 2/2016 | Shah | H04W 76/16 |
| | | | 370/311 |
| 2016/0095159 A1* | 3/2016 | Su | H04W 8/183 |
| | | | 370/311 |
| 2016/0261509 A1* | 9/2016 | Chou | H04L 47/22 |
| 2017/0064770 A1* | 3/2017 | Patwardhan | H04W 74/08 |
| 2018/0242243 A1* | 8/2018 | Kela | H04W 52/0216 |
| 2019/0141622 A1* | 5/2019 | Sharma | H04W 4/70 |

FOREIGN PATENT DOCUMENTS

| | | |
|---|---|---|
| CN | 103283300 A | 9/2013 |
| EP | 2390754 A1 | 11/2011 |

OTHER PUBLICATIONS

International Search Report based on application No. PCT/US2015/067254 (14 pages) dated Sep. 13, 2016 (Reference Purpose Only).
European Supplementary Search Report for European Application No. 15911617.7 dated Jun. 7, 2019, 8 pages (for reference purpose only).
Chinese First Office Action issued for the Chinese Application No. 201580084756.1, dated Dec. 3, 2020, 13 pages (for informational purposes only).

\* cited by examiner

POWER SAVING HOST-MODEM INTERACTION IN A COMMUNICATION DEVICE

CROSS-REFERENCE TO RELATED APPLICATION

This patent application is a national stage entry of International Application No. PCT/US2015/067254 under 35 U.S.C. §§ 365 and 371, filed on Dec. 22, 2015, and is incorporated herein by reference in its entirety and for all purposes.

TECHNICAL FIELD

Various aspects of the description relate generally to power saving host-modem interaction in a communication device, and in particular in a wireless communication device.

BACKGROUND

A computerized communication device for use in a (public or private) communications network may typically have an architecture including a host system and a modem system interconnected by an internal interface, such as an inter-processor communication (IPC) interface. The host system may include a host processor for controlling components of the communication device and for communicating with the modem system via the interface, while the modem system includes a modem processor for controlling components of the modem system and for communicating with the host system via the interface. The modem system usually includes a transceiver arranged to communicate with the modem processor and to transmit data to, and receive data from, a communications network.

In a wireless environment, the communication device may be a mobile radio communication device, e.g. a mobile radio communication terminal device, such as a hand-held smartphone, tablet or notebook computer, digital assistant or the like, capable of communicating with another communication device through a wireless network, such as a WLAN (Wireless Local Area Network) or public cellular radio system. In the wireless setting, the transceiver of the modem system transmits radio signals to the communications network and receives radio signals from the communications network.

In a wireline environment, the communication device may be operated in a stationary mode (at least temporarily), and the transceiver of the modem system may be electrically connected to the communications network to transmit and receive electric signals.

In a conventional device architecture, the computerized communication device may include functional and/or structural modules defining the host system and the modem system, with the host system acting as a primary system (master) and the modem system acting as a secondary system (slave). Both systems may interact via an inter-processor communication (IPC) interface internal to the communication device. The host system typically supervises the operation of the modem system in the process of transmitting data to the network and receiving data from the network. By way of example, the host system may assess the modem system operation with a view to power management: If the host system does not detect any modem activity for a predetermined amount of time, e.g. 5 seconds, the host system may consider the modem system to be in an inactive mode and may power down device components that rely on modem activity. This approach seeks to save energy and, thus, to extend the recharging interval of a storage battery of the communication device.

In a conventional communication device, the duration of modem inactivity that triggers a power down procedure by the host is typically determined on a heuristic basis striking a balance between modem availability and energy consumption: Switching off the interface (or putting it in a low power state such as a sleep mode) after a relatively short period of modem inactivity saves more energy but tends to introduce undesirable latencies in the transmission or receipt of data by the modem system (since wake-up procedures may be slow). Switching off the interface after a relatively long period of modem inactivity keeps latencies low but may keep the power consumption high for an unnecessary amount of time.

Experiments on live LTE (long-term evolution) communications networks for different platform workloads reveal that during a typical 10-minute browsing session accessing various popular websites (such as Facebook, Twitter, etc.), only about 1.5 seconds (less than 1% of the time) may be needed to download the data. The modem system may be active 20% of the time transmitting and receiving payload or signaling information. The remaining 80% of the session time are periods of inactivity on the radio link ranging from a few hundred milliseconds to several seconds (e.g. 10 seconds or more) during which the modem system resides in low power states. However, other platform components such as the host CPU and the IPC interface may remain active in high power states waiting for modem events.

SUMMARY

A communication device may include a host and a modem interconnected by an interface. The host may include a host processor configured to control components of the communication device and to communicate with the modem via the interface. The modem may include a modem processor configured to control components of the modem and to communicate with the host via the interface, and a transceiver configured to communicate with the modem processor and to transmit data to, and receive data from, a communications network. The modem processor may be configured to identify a reduced activity state of the modem and to communicate information on the reduced activity state to the host processor. The host processor may be configured to reduce, in response to the information on the reduced activity state of the modem, an operation of at least one component of the communication device.

BRIEF DESCRIPTION OF THE DRAWINGS

In the drawings, like reference characters generally refer to the same parts throughout the different views. The drawings are not necessarily to scale, emphasis is instead generally being placed upon illustrating the principles of the invention. In the following description, various embodiments of the invention are described with reference to the following drawings, in which.

DESCRIPTION

Figure 1:
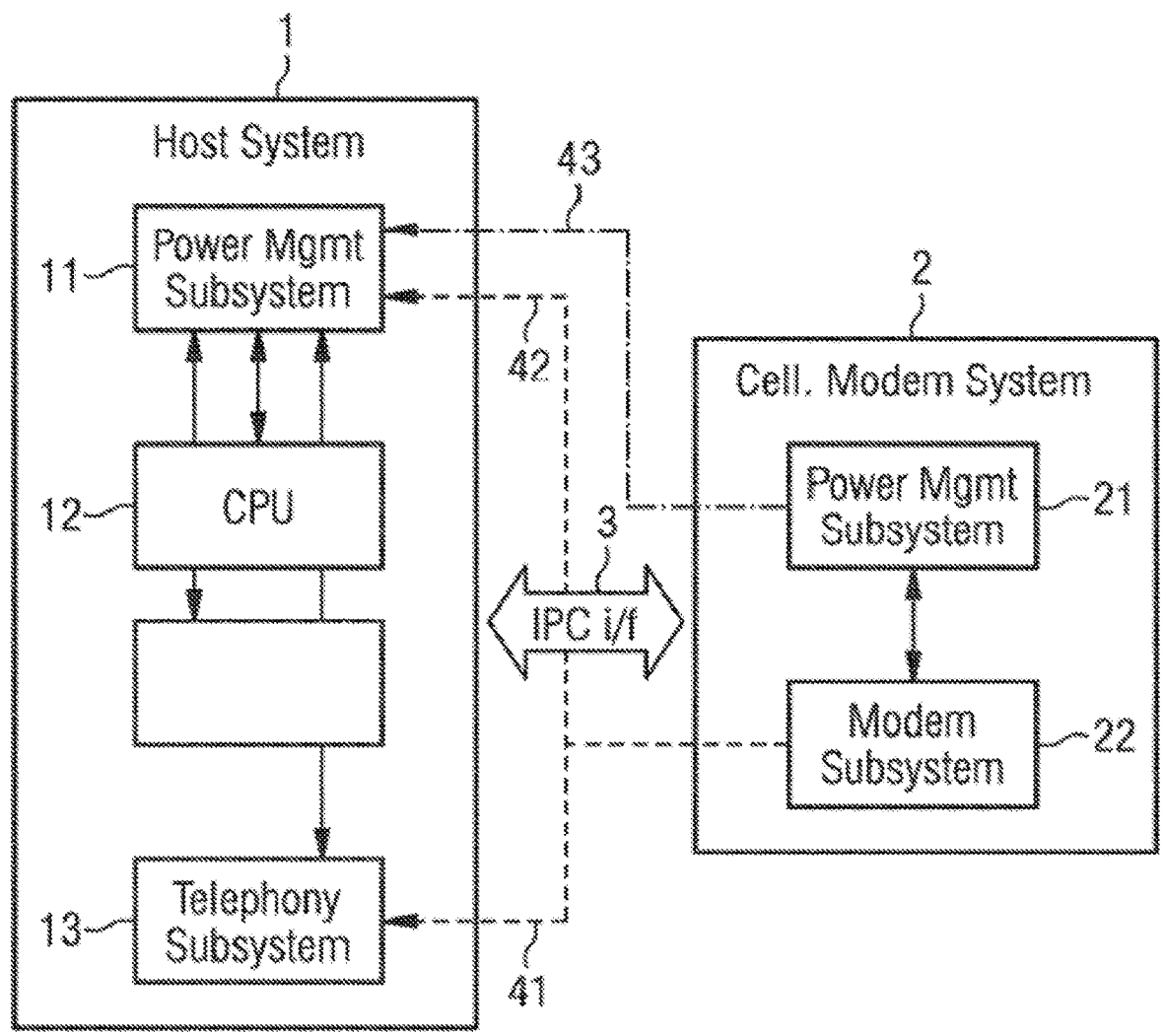
FIG. 1 shows a schematic block diagram of a communication device.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The components of the communication devices (e.g. the application processor) may for example be implemented by one or more circuits. A "circuit" may be understood as any kind of a logic implementing entity, which may be special purpose circuitry or a processor executing software stored in a memory, firmware, or any combination thereof (e.g. an operating system). Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

For purposes of this disclosure, radio communication technologies may be classified as one of a Short Range radio communication technology, Metropolitan Area System radio communication technology, or Cellular Wide Area radio communication technology (also referred to as Wireless Wide Area Network (WWAN) radio communication technology). Short Range radio communication technologies include Bluetooth, WLAN (Wireless Local Area Network) (e.g. according to any IEEE 802.11 standard or e.g. WiFi), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Universal Mobile Telecommunications System (UMTS), Long Term Evolution (LTE), LTE-Advanced (LTE-A), Code Division Multiple Access (CDMA), Wideband CDMA (WCDMA), General Packet Radio Service (GPRS), Enhanced Data Rates for GSM Evolution (EDGE), High Speed Packet Access (HSPA), HSPA Plus (HSPA+), and other similar radio communication technologies.

The term "network" as utilized herein, e.g. in reference to a communication network such as a mobile communication network, is intended to encompass both an access section of a network (e.g. a radio access network (RAN) section) and a core section of a network (e.g. a core network section).

Unless explicitly specified, the term "transmit" encompasses both direct and indirect transmission. Similarly, the term "receive" encompasses both direct and indirect reception unless explicitly specified.

In various aspects of this disclosure, while a host system of a communication device may represent the primary or supervising level in the hierarchy of the communication device, a modem system may have some autonomy in managing the interaction of its transceiver with a communications network. By way of example, the modem system may have information about its own network activity in greater detail and/or at an earlier point in time compared to the availability of that information in the host system. For example, the modem system may know that it has just transmitted data to a base station of the network and that another exchange of data with the base station (e.g. a reply from the base station) cannot take place until a new time frame or time slot starts which may be assigned to the communication device by a general communication protocol or by the specific base station in the light of a current workload of the base station or communications network.

Therefore, the modem processor may be configured to predict or be able to determine a period of reduced activity of the modem and to communicate information on the period to the host processor, and the host processor may be configured to reduce, during at least part of the period, the operation of the least one component of the communication device or of the host sub-system or the IPC.

Reducing the operation of a device component may encompass powering down that component or putting it into an intermediate low power state, a waiting or sleeping state or the like. Alternative power saving modes may include reducing a clock signal frequency.

Candidate components whose operation may be reduced or stopped may encompass any component that is waiting to transmit data to, or to receive data from, the network via the transceiver of the modem system. Notably, the interface between the host system and the modem system may be powered down or operated at a reduced clock frequency, for example.

A component to be stopped or slowed down may be any hardware circuitry or software module, since a reduced operation of any component translates directly or indirectly into a reduced consumption of energy during the time of reduced operation.

Low power states of communications functions and components implemented in hardware may be realized by clock gating or power gating, for example. This reduces power consumption by avoiding dynamic power requirements and leakage current contributions of the clock gated or power gated circuits.

Low power states of communications functions and components implemented in software and executed on shared hardware resources, such as a CPU, may result in less computational load or shorter activity cycles of the shared hardware resources. Generic power saving techniques such as dynamic voltage and frequency scaling (DVFS) for CPUs may translate the reduced load or activity into reduced power consumption.

The energy savings achieved may be particularly advantageous in a mobile radio communication device which runs on batteries. Reducing the operation of device components (platform components) during inactive periods of the transceiver extends the recharging interval of the communication device.

A communication device as shown in FIG. 1 may include a host system (also referred to as host) 1 and a modem system (also referred to as modem) 2 interconnected e.g. by an inter-processor communication (IPC) interface 3. In an example, the modem 2 may be a cellular modem to establish a radio link to a wireless communications network, e.g. a WWAN communications network (not shown). The host 1 may include a host processor (CPU) 12, a power management sub-system (also referred to as power management sub-circuit) 11 and a telephony sub-system (also referred to as telephony sub-circuit) 13.

The modem 2 may include a modem processor which may implement a power management sub-system (also referred to as power management sub-circuit) 21 and one or more other modem sub-systems (also referred to as modem sub-circuits) 22. The modem 2 may further include a transceiver (not shown) configured to communicate with a base station (not shown) of a communications network via a radio link. The communication device as well as the communications network may be configured in accordance with the LTE mobile radio communications technology standard.

The LTE standard defines special modem Radio Resource Control (RRC) states to reduce the power consumption involved in maintaining a high-data rate connection including the signaling between a cellular network and a mobile device. Those RRC states include "connected state Discontinuous Reception" (cDRX) and "Idle state". In these RRC states, the LTE modem of the communication device (e.g. communication terminal device) may temporarily transition to low power states, even when the user is actively using the communication device, if there are sufficient periods of inactivity on the communication interface.

As mentioned above, a conventional approach to power down the IPC interface 3 (e.g. USB) is based on heuristics, i.e. the host basically keeps track of the amount of time the IPC link has been inactive and when that time exceeds a pre-determined threshold, e.g. 5 seconds, then the interface is powered down. However, such heuristic-based intervals may cause the IPC to spend unnecessarily long times in high-power states. Moreover, the heuristic-based mechanism may have to be tuned for each interface separately to take account of different delay penalties.

According to the present disclosure, the modem 2 may communicate to the host 1 its current RRC state and/or scheduling information such as a projected idling period to a next modem event. This communication may allow the host 1 to make a quick and reliable decision on when to power down the IPC interface 3 and to determine a maximum duration of the power-down state based on the RRC state, the scheduling information and any inherent wake-up delay. Thus, the power saving benefit can be optimized without introducing latencies.

Another conventional approach triggers a power down of the IPC interface 3 (e.g. USB) when the modem 2 enters into certain low power states, e.g. deep sleep state. This approach may result in unnecessary activity and power consumption of the IPC interface 3 when the cellular modem 2 is in active states due to internal activities of a modem sub-system 22 (e.g. monitoring signaling channels) without communication to the host 1.

According to an aspect of the present disclosure, the host 1 can decide to power down the IPC interface 3 immediately when the modem 2 enters into an RRC state, e.g. "connected DRX" (cDRX), in which no payload (e.g. IP packets) will be processed for a known period of time.

The modem 2 may identify and send modem idling information for run-time synchronization between the modem 2 and the host 1 with respect to RRC states of the modem 2. In this context, three basic aspects may be considered:
1. RRC state change detection and trigger.
2. Sending modem RRC state information to the host.
3. Response of the host to the modem RRC state information.

Those aspects may be described as follows.

1. RRC State Change Detection and Trigger

According to LTE specifications, an LTE modem may be in one of two possible RRC states with respect to the base station (eNB): "RRC_Connected" or "RRC_Idle". The "RRC_Connected" state has a sub-state "cDRX" in which the receiver may be turned off when no signaling channels have to be monitored.

According to the present disclosure, the modem 2 signals its RRC states such as "cDRX" and "Idle" to the host 1. While the signaling is indicated by dashed lines 41, 42 in FIG. 1, it is not limited to using any dedicated line or separate IPC channel for the RRC state data. The modem state information may be multiplexed into the same IPC channel that may be used in a conventional modem power management sub-system to expose modem low power states to the host 1.

The modem state information enables the host 1 to set the IPC interface 3, host components 12, 13 or modem components 22 to a lower power state more frequently and/or for longer periods than in the conventional approaches.

Performance requirements of communication functions between the modem 2 and an application hosted by the host system 1 may be indicated to the host 1 on the basis of modem state (or context) information from all layers of a communications protocol. For example, low (PHY) level timing information from the modem 2 may be exposed to the host 1 to trigger low power state transitions of selected communication functions between the modem 2 and an application running in the host 1.

Thus, in an aspect of the present disclosure, the host 1 is distinguished over a conventional host which requests and reads accessible modem state information on demand by the host. Examples of such information include registration information for a telephony subsystem, modem (baseband and radio frequency, RF) state information for typical commercial network or RF signal monitoring applications, and status updates (e.g. of Android phones) concerning displayed indicators of the signal strength (bar symbol) or operator name (text). In various aspects of this disclosure, there is a difference in the timing of the information when it is sent from the radio subsystem to the host. Although the host may know the signal strength information, but it is over a period of time and there is a necessary lag between when this event happens and when it is conveyed. Both the breadth of the details of the information passed (conventionally this information is not really sent to the host) is increased and the lag time between occurrence and reporting is reduced.

Figure 2:
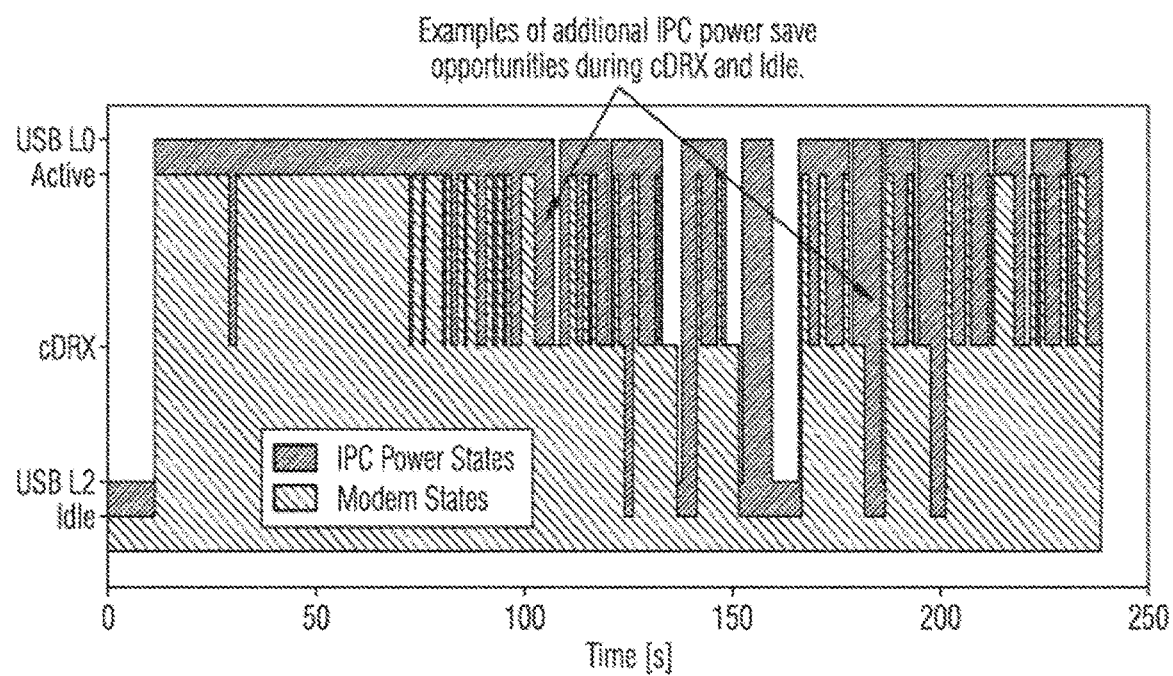
FIG. 2 shows an exemplary relationship of modem states and interface states occurring during a browser session.

FIG. 2 illustrates exemplary power states of an IPC interface in relation to modem states in a conventional communication device during a Youtube video streaming case with an Intel® XMM™ 7260 modem. The solid line [contour of blue area] shows the modem RRC states which are "RRC connected—Active" (receive/RX and/or transmit/TX activity), "RRC connected—cDRX" (no RX/TX activity but regular PDCCH [Physical Downlink Control Channel] monitoring during on Duration), and "RRC Idle" (no RX/TX activity but regular paging channel monitoring). The dashed line [contour of red area] depicts the corresponding IPC power states which are L0 (active) and L2 (selective suspend) for an USB 2.0 IPC connection to a Windows 8.1 host. (While examples in this disclosure refer to a Windows 8.1 host system, the principles of the disclosure apply to any operating system.)

FIG. 2 shows that a heuristic suspend strategy (underlying the Windows MBIM driver, for example) is not able to exploit all sleep opportunities, i.e. the IPC interface often remains in a high power state L0 although the modem is already in a cDRX or Idle RRC state and no data is transmitted over the IPC interface.

Conversely, the present communication device allows the full potential of power savings to be utilized by setting the IPC interface 3 to a low power state "L2" each time the modem RRC state is less than "Active". In the example shown, this approach reduces the active time of the IPC interface 3 by 48%.

An LTE modem may trigger and detect an RRC state change. Whenever the LTE modem changes RRC states from "RRC_Idle" to "RRC_Connected" or vice-versa, or whenever it enters into a cDRX state from an active state or vice-versa, it may send transition information to the host as indicated by dashed lines 41, 42 in FIG. 1. This operation may take place on top and independently of any conventional operation in which the modem indicates to the host (chain-dotted line 43 in FIG. 1) that it is about to enter a modem low power state, e.g. deep sleep, to make the host aware of long sleep state exit latencies.

2. Sending Modem RRC State Information to the Host

The following types of information may be exposed at the IPC interface:

Logical modem RRC state transitions between "RRC Connected—Active", "RRC Connected—cDRX", and "RRC Idle states".

Time to next modem event at which data relevant for the host is expected, e.g. an IP packet received from the network.

Sophisticated messages may be used to allow for differentiated power saving decisions at the host side. For example, when an inactivity timer expires and the LTE modem enters into an RRC state "cDRX", the modem may indicate to the host that no receive data is expected for the foreseeable future and the next time to revisit this statement is in the next DRX cycle. The inactivity timer and DRX cycle may be defined by the cellular network. Typical settings may be 200 ms and 320 ms, respectively.

3. Response of the Host to the RRC State Information of the Modem

Figure 3:
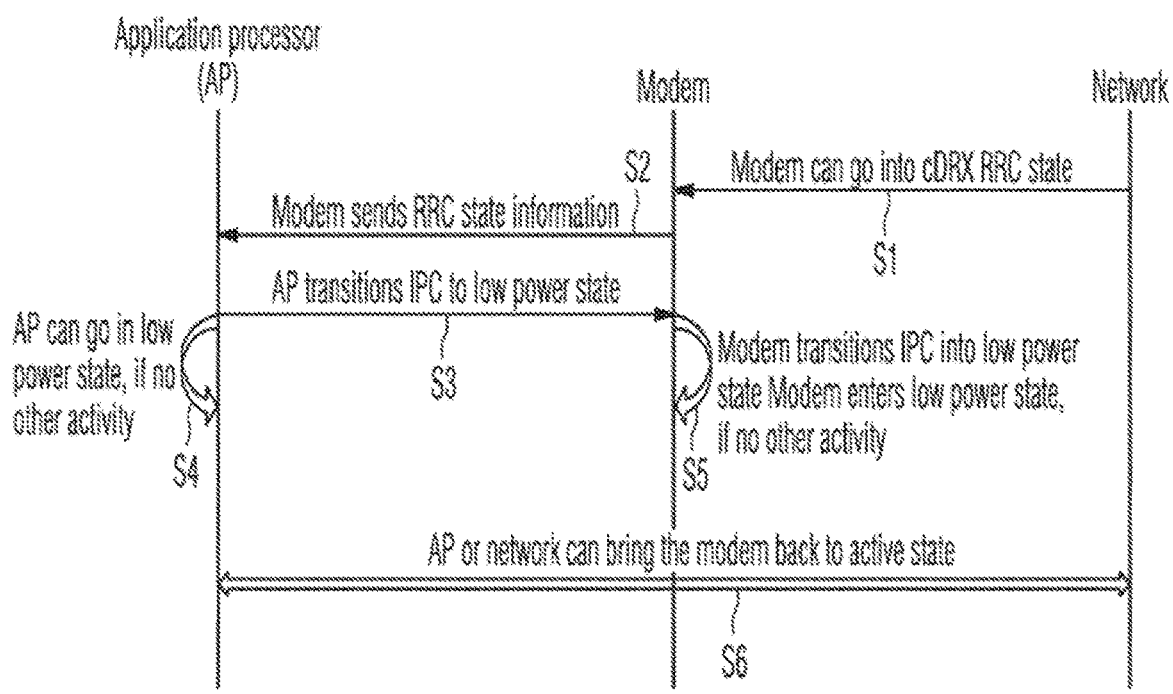
FIG. 3 shows an exemplary sequence of messages and interactions between the host processor, the modem and a communications network.

FIG. 3 depicts an exemplary sequence of messages and interactions between the host processor (also referred to as application processor AP, i.e. a processor hosting an application), the modem and a communications network. In S1, a modem-network interaction allows the modem to go into an RRC state "cDRX". In S2, the modem sends information on its changed RRC state to the host AP. In S3, the host processor (AP) parses and evaluates the cellular modem RRC state information (or state change information) exposed at the IPC interface, and takes appropriate actions to minimize system power consumption, e.g. by placing the IPC interface into a low power state. For example, during a video streaming use, once the modem enters the RRC state "cDRX" after receiving a data burst, the host processor may put the IPC interface into a low power state (L2). The host processor (AP) itself and the modem may also enter into low power states (S4, S5) if no other activity is impending. The host processor (AP) or the network can bring the modem back to an active state (S6) or the modem or host processor may have knowledge of the next timed operation requiring power-up to an Active state and time themselves accordingly for transitioning back to active state (S6).

The same concept may be applied to additional data path components of telephony, communications and media stacks between the video sub-system and the modem interface, and the host may put those components in low power states as well, depending on low power state entry/exit latencies of the respective components.

To outline the broad applicability of the present disclosure, a non-exhaustive overview of exemplary modem parameters and states that the modem may expose to the host will be given next.

Cell specific network parameters may include messages from a system information block (SIB) valid for all user equipments (UEs) within the cell in which the communication device is operating. Such information may concern e.g. the cell bandwidth or a Physical Random Access Channel (PRACH) configuration.

UE-specific network-related parameters may originate from higher level signaling (e.g. an RRC connection setup message) and may be different for each UE. Such parameters may contain e.g. cDRX settings or a Scheduling Request (SR) configuration or Semi-Persistent Scheduling (SPS) configuration.

PHY/MAC layer states or CPS (cellular protocol stack) states may include: RRC modem states which are related to dynamic states in different network layers, e.g. cDRX parameters (drxInactivity timer, onDuration timer, LongDrxcycle, paging cycle) or RRC states (RRC_idle or RRC_connected).

Modem states, e.g. modem power states, which are not directly related to the cellular network connection may also be exposed to the host.

To further outline the broad applicability of the present disclosure, exemplary scenarios will be described to illustrate how the modem may expose its parameters and states to the host processor and how the host processor may use those parameters and states to initiate power savings.

Examplary Scenario 1: The Transmit (Tx) Activity of the Host May be Synchronized with an Uplink Timing of the Modem An application may contain a communication function that seeks to send data over the cellular network. The time window for the modem to request uplink (UL) resources (scheduling request, SR) may be determined by network settings and states. The modem may provide a host/context engine with information on the timing of a next modem uplink window opportunity, e.g. an SR window in the Physical Uplink Control Channel (PUCCH, e.g. every 40 or 80 ms) or in the Random Access Channel (RACH, e.g. every 10 ms), or an uplink SPS grant. Based on that information, the host may synchronize (=postpone and buffer) transmit-data packets (tx packets) with the modem uplink time to minimize modem wake-time and to maximize periods of time during which building blocks of the modem stay in low power states.

The power management subsystem of the host may initiate transitions into low power states of tx communications functions between the cellular modem and the application, e.g. the tx functions and buffers of the IPC interface, uplink functions and buffers of the telephony subsystem, tx data layer of communications stacks, such as TCP/IP and the tx functions and buffers of the application.

The context information used may include an RRC state, an SR and RACH configuration and a time tick to indicate the next uplink opportunity (e.g. the time to the next uplink opportunity). As a result, the power consumption of all tx/UL components and of the modem is reduced during the time between the end of an uplink and the grant of a next uplink.

Examplary Scenario 2: The Host Postpones Non-Time Critical Background Traffic to Avoid Additional Active Periods of the Modem Several applications containing communications functions may be running in parallel. The tx data of some applications may not be time-critical, e.g. an application may be running in the background, or the application may be running when the screen is off or no direct user interaction is taking place. Non-time critical data traffic may include DHCP lease renewal or data packets originating from applications which can tolerate some delay (e.g. email applications) as opposed to time-critical applications such as streaming applications.

When the modem exposes its state "RRC_idle" to the host, the host communication functions may postpone delay-tolerant traffic and bundle it with delay-sensitive traffic or wait for a pre-determined time threshold, which triggers an RRC state transition anyway. Thus, additional RRC state transitions and therefore power consuming signaling may be avoided.

When the modem exposes its state "C-DRX" to the host, the host communication functions may postpone delay-tolerant traffic and bundle it with delay-sensitive traffic or wait until a pre-determined threshold of time. A postponing an operation or task is one example for a "reduced operation" of the communication device. The number of times the inactivity timer is triggered is reduced (bundled traffic triggers the inactivity timer only once). Therefore, the modem may stay longer in low power states.

The context information used may include the RRC state, C-DRX settings, current inactivity timer and on-duration subframe ticks (e.g. timer values) from the LTE PHY layer. A specific implementation for very short time intervals e.g. in the range of tens of ms may be a dedicated Hardware line from the modem to the host that is asserted/deasserted by a synchronous interrupt which indicates the beginning of the next on-duration. For longer time intervals e.g. in the range of hundreds of ms or longer a timestamp in a Software message exchanged between the modem and the host via the IPC interface may be an appropriate implementation despite the inherent longer delays compared to the Hardware line above.

As a result, power consumption in the modem and the communications subsystems is reduced.

Examplary Scenario 3: Component Carrier (CC) Deactivation

An application may be running a communication function, e.g. a file download according to a File Transfer Protocol (FTP). The Media Access Control (MAC) layer of the modem may indicate a modem state change concerning a de-activation of a component carrier to the host/context engine via an IPC interface, and the state change information may include supplementary information on the time when the de-activation will become effective for downlink grant opportunities for the network.

Based on that information, the host/context engine may realize that the maximum sustained downlink throughput will be limited to the peak throughput of a single component carrier. The host power management subsystem may initiate low power state transitions of communications functions between the cellular modem and the application that are required to manage data throughput beyond the limit of a single component carrier. For example, the depths of receive (Rx) buffers may be reduced, or extra internet protocol (IP) header processing engines required for high throughput may be powered down.

In addition to the information on component carrier de-activation (from a modem MAC layer control element), the context information used may include information on the maximum download throughput per carrier and a time tick (e.g. the time when the de-activation will become effective) when the de-activation will become effective for downlink grants from the physical layer (PHY) of the modem. As a result, power consumption in the communications subsystems is reduced after carrier de-activation.

Examplary Scenario 4: Host Subsystems May be Turned Off in RRC State "C-DRX"

The host may be running a video streaming application. The physical layer (PHY) of the modem may indicate to the host/context engine (via the IPC interface) that the modem transitions into the RRC state "C-DRX". The modem may provide supplementary information indicating the time to the next downlink grant opportunity for the network (start of next On-Duration).

The context engine may recognize that no downlink data will be received from the cellular network connection until the start of the next On-Duration. The power management subsystem of the host may initiate state transitions into low power states of rx communications functions between the cellular modem and the application, e.g. the rx functions and buffers of the IPC interface, downlink functions and buffers of the telephony subsystem, rx data layer of communications stacks, such as TCP/IP and the rx functions and buffers of the applications, such as a video streaming client.

The context information provided from the LTE PHY layer may include information on the state transition from "Active" to "C-DRX" and may indicate the time to the next On-Duration. As a result, the power consumption of rx downlink components may be reduced during the period of time between a C-DRX state transition and the next On-Duration.

Examplary Scenario 5: Telephony Housekeeping May be Postponed

An application may want to check a status of the modem (e.g. values of the Receive Signal Strength Indicator, RSSI) at regular intervals. The context engine may recognize the power state of the modem and of the IPC interface. When the modem is in a low power state, the host may postpone the status request until the modem is awake anyway.

The context information used may include the power state of the modem and the time until a next scheduled modem event. As a result, the power consumption of the modem and the IPC interface may be reduced as no additional wake-ups are required.

Examplary Scenario 6: The Modem Detects a Drop in the Signal Strength Received at the User Equipment An application may be sending delay-tolerant traffic or downloading a file having no impact on latency (e.g. pre-fetching data from a website for later use). At the same time, there may be a marked decrease in the received signal strength. The modem may provide a low Receive Signal Strength Indicator (RSSI) to the host to indicate poor channel conditions. Based on that information, the host may postpone the transmission of data or a download operation and wait for better signal conditions since a poor RSSI condition may lead to repeated re-transmissions and may prolong the time required to send/receive data.

The context information used may include the RSSI available at the modem and information on the delay-tolerant nature of the application. As a result, power consumption of the modem and the IPC interface may be reduced as the host buffers data or cancels a download until favorable conditions can be established.

The present examples apply in particular to any platform including an IPC interface (between the host and modem), notably a USB (universal serial bus) or PCIe (Peripheral Component Interconnect express) interface. In USB based modems, certain low power states of IPC (such as L2 for USB 2.0, or U3 for USB 3.0) may only be initiated by the host, through a selective suspend mechanism. Hence, exposing modem RRC state information to the host is an appropriate way to control such interfaces into low power states. In PCIe modems which allow for fine grained power management, coordination between modem RRC states and IPC low power states, e.g. L0 or L1.2, is feasible already locally at the modem side which can lead to faster decisions to enter low power states. However, coordination with the host may still be required to ensure proper handling of low power state entry and exit latencies.

The operations and effects described above may be achieved in any host or application processor (client, phone, tablet) connected to an (e.g. cellular) modem via an interprocessor communication (IPC) interface. The level of integration (discrete modem, SoC [System-on-a-Chip] integration, SiP [System-in-a-Package] integration, or the like) does not affect the operating principles disclosed. No telecommunication standard needs to be modified or adapted to achieve the power savings in the communication device disclosed.

In the above examples, the modem communicates information on its RRC states to the host so that the host may power down an IPC interface (e.g. USB) fully controlled by the host. However, the platform-level power saving measures controlled by the host are not limited to an IPC interface. As an alternative, a multi-master IPC interface (e.g. PCIe) may be powered down. Moreover, any other building blocks of the host or modem that are temporarily not needed in the particular RRC state may be powered down.

In summary, the present disclosure may provide an improved computerized communication device including a host system and a modem system interconnected by an interface such as to reduce the power consumption of the device without reducing its availability for data transmission to, and data receipt from, a communications network. The disclosure may also provide an improved method for operating such a communication device with a view to reducing its power consumption while keeping the transmission and reception latencies low.

In the following, various aspects of this disclosure will be illustrated:

Example 1 is a communication device. The communication device may include a host and a modem interconnected by an interface. The host may include a host processor configured to control components of the communication device and to communicate with the modem via the interface. The modem may include a modem processor configured to control components of the modem and to communicate with the host via the interface, and a transceiver configured to communicate with the modem processor and to transmit data to, and receive data from, a communications network. The modem processor may be configured to identify a reduced activity state of the modem and to communicate information on the reduced activity state to the host processor, and the host processor may be configured to reduce, in response to the information on the reduced activity state of the modem, an operation of at least one component of the communication device.

In Example 2, the subject matter of Example 1 can optionally include that the modem processor is configured to predict a period of reduced activity of the modem and to communicate information on the period of reduced activity to the host processor, and that the host processor is configured to reduce, during at least part of the period, the operation of the at least one component of the communication device.

In Example 3, the subject matter of any one of Examples 1 or 2 can optionally include that the host processor is configured to power down the interface between the host and the modem in response to the information on the reduced activity state of the modem.

In Example 4, the subject matter of any one of Examples 1 to 3 can optionally include that the at least one device component includes a hardware component.

In Example 5, the subject matter of any one of Examples 1 to 4 can optionally include that the at least one device component includes a software component.

In Example 6, the subject matter of any one of Examples 1 to 5 can optionally include that the communication device is a mobile radio communication device, and that the transceiver is configured for wireless transmission of data to the communications network and for wireless receipt of data from the communications network.

Example 7 is a method of data communication between a host and a modem interconnected by an interface. The method may include a host processor of the host controlling one or more components of a communication device and communicating with the modem via the interface, a modem processor of the modem controlling components of the modem and communicating with the host via the interface, and a transceiver of the modem communicating with the modem processor and transmitting data to, and receiving data from, a communications network. The modem processor may identify a reduced activity state of the modem and communicate information on the reduced activity state to the host processor. The host processor may reduce, in response to the reduced activity state information, an operation of at least one component of the communication device.

In Example 8, the subject matter of Example 7 can optionally include that the modem processor predicts a period of reduced activity of the modem and communicates information on the period to the host processor, and that the host processor reduces, during at least part of the period, the operation of the at least one component of the communication device.

In Example 9, the subject matter of any one of Examples 7 or 8 can optionally include that the host processor powers down the interface between the host and the modem in response to the information on reduced modem activity.

In Example 10, the subject matter of any one of Examples 7 to 9 can optionally include that the operation of the at least one component is at least partially implemented in hardware.

In Example 11, the subject matter of any one of Examples 7 to 10 can optionally include that the operation of the at least one component is at least partially implemented in software.

In Example 12, the subject matter of any one of Examples 7 to 11 can optionally include that the host and the modem operate in a mobile radio communication device, and that the transceiver transmits data to, and receives data from, the communications network in a wireless manner.

Example 13 is a communication device. The communication device may include a host, and a modem coupled to the host. The host may include a host circuit configured to control at least one other circuit of the communication device and to communicate with the modem. The modem may include a modem circuit configured to control at least one other circuit of the modem and to communicate with the host, and a transceiver configured to communicate with the modem circuit and to transmit and receive data signals. The modem circuit may further be configured to identify a reduced activity state of the modem and to provide information about the reduced activity state of the modem to the host circuit. The host circuit may be configured to reduce, in response to the information about the reduced activity state of the modem, an operation of at least one other circuit of the communication device.

In Example 14, the subject matter of Example 13 can optionally include that the modem circuit is configured to predict a period of reduced activity of the modem and to communicate information on the period of reduced activity to the host circuit, and that the host circuit is configured to reduce, during at least part of the period, the operation of the at least one other circuit of the communication device.

In Example 15, the subject matter of any one of Examples 13 or 14 can optionally include that the communication device further includes a communication interface configured to provide a communication between the host and the modem. The host circuit may be configured to power down the communication interface between the host and the modem in response to the information about the reduced activity state of the modem.

In Example 16, the subject matter of any one of Examples 13 to 15 can optionally include that the at least one other circuit of the communication device is implemented in hardware.

In Example 17, the subject matter of any one of Examples 13 to 16 can optionally include that the at least one other circuit of the communication device is implemented in software.

In Example 18, the subject matter of any one of Examples 13 to 17 can optionally include that the communication device is configured as a mobile radio communication device, and that the transceiver is configured for wireless transmission and receipt of data.

Example 19 is a method of data communication between a host and a modem. The method may include a host circuit of the host controlling one or more additional circuits of a communication device and communicating with the modem, a modem circuit of the modem controlling one or more additional circuits of the modem and communicating with the host, a transceiver of the modem communicating with the modem circuit and transmitting data to, and receiving data from, a communications network, the modem circuit identifying a reduced activity state of the modem and communicating information about the reduced activity state of the modem to the host circuit, and the host circuit reducing, in response to the information about the reduced activity state of the modem, an operation of at least one additional circuit of the communication device.

In Example 20, the subject matter of Example 19 can optionally include that the modem circuit predicts a period of reduced activity of the modem and communicates information on the period to the host processor, and that the host circuit reduces, during at least part of the period, the operation of the at least one additional circuit of the communication device.

In Example 21, the subject matter of any one of Examples 19 or 20 can optionally include that the host circuit powers down a communication interface between the host and the modem in response to the information about reduced modem activity of the modem.

In Example 22, the subject matter of any one of Examples 19 to 21 can optionally include that the operation of the at least one additional circuit of the communication device is at least partially implemented in hardware.

In Example 23, the subject matter of any one of Examples 19 to 22 can optionally include that the operation of the at least one additional circuit of the communication device is at least partially implemented in software.

In Example 24, the subject matter of any one of Examples 19 to 23 can optionally include that the host and the modem operate in a mobile radio communication device, and that the transceiver transmits data to, and receives data from, a communications network in a wireless manner.

Example 25 is a computerized communication device including a host system and modem system interconnected by an interface. The host system may include host processing means for controlling components of the communication device and for communicating with the modem system via the interface. The modem system may include modem processing means for controlling one or more components of the modem system and for communicating with the host system via the interface, and transceiver means arranged to communicate with the modem processing means and to transmit data to, and receive data from, a communications network. The modem processing means may be configured to identify a reduced activity state of the modem system and to communicate information on the reduced activity state to the host processing means. The host processing means may be configured to reduce, in response to the reduced activity state information, an operation of at least one component of the communication device.

In Example 26, the subject matter of Example 25 can optionally include that the modem processing means is configured to predict a period of reduced activity of the modem system and to communicate information on the period of reduced activity of the modem to the host processing means, and that the host processing means is configured to reduce, during at least part of the period, the operation of the at least one component of the communication device.

In Example 27, the subject matter of any one of Examples 25 or 26 can optionally include that the host processing means is configured to power down the interface between the host system and the modem system in response to the information on reduced modem activity of the modem.

In Example 28, the subject matter of any one of Examples 25 to 27 can optionally include that the at least one device component includes a hardware component.

In Example 29, the subject matter of any one of Examples 25 to 28 can optionally include that the at least one device component comprises a software component.

In Example 30, the subject matter of any one of Examples 25 to 29 can optionally include that the communication device is a mobile radio communication device, and that the transceiver means is configured for wireless transmission of data to the communications network and for wireless receipt of data from the communications network.

Example 31 is a computerized method of data communication between a host system and modem system interconnected by an interface. The method may include host processing means controlling one or more components of the communication device and communicating with the modem system via the interface, modem processing means controlling one or more components of the modem system and communicating with the host system via the interface, transceiver means of the modem system communicating with the modem processing means and transmitting data to, and receiving data from, a communications network, the modem processing means identifying a reduced activity state of the modem system and communicating information on the reduced activity state of the modem system to the host processing means, and the host processing means reducing, in response to the information on the reduced activity state of the modem system, an operation of at least one component of the communication device.

In Example 32, the subject matter of Example 31 can optionally include that the modem processing means predicts a period of reduced activity of the modem system and communicates information on the period to the host processing means, and that the host processing means reduces, during at least part of the period, the operation of the at least one component of the communication device.

In Example 33, the subject matter of any one of Examples 31 or 32 can optionally include that the host processing means powers down the interface between the host system and the modem system in response to the information on reduced modem activity of the modem system.

In Example 34, the subject matter of any one of Examples 31 to 33 can optionally include that the operation of the at least one component is at least partially implemented in hardware.

In Example 35, the subject matter of any one of Examples 31 to 34 can optionally include that the operation of the at least one component is at least partially implemented in software.

In Example 36, the subject matter of any one of Examples 31 to 35 can optionally include that the host system and the modem system operate in a mobile radio communication device, and that the transceiver means transmits data to, and receives data from, the communications network in a wireless manner.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device, comprising:
   a host and a modem interconnected by an interface;
   wherein the host comprises:
      a host processor configured to:
         control components of the communication device and
         communicate with the modem via the interface;
   wherein the modem comprises:
      a modem processor configured to:
         control components of the modem and
         communicate with the host via the interface;
   wherein the modem processor is further configured to:
      identify a reduced activity state of the modem,
      determine a projected expiration of a reduced activity period of the modem, based on a time remaining until a next event of the modem,
      communicate information on the reduced activity state of the modem to the host processor, and
      communicate the time remaining until the next event of the modem to the host processor;
   wherein the host processor is further configured to reduce an operation of at least one component of the communication device based on receipt of the information on the reduced activity state of the modem and the time remaining until the next event of the modem;
   wherein the reduced activity state of the modem comprises a radio resource control (RRC) state of the modem; and
   wherein the information on the reduced activity state of the modem comprises an indication of the RRC state of the modem.

2. The communication device of claim 1, wherein the host processor is further configured to reduce, during at least part of the reduced activity period of the modem, the operation of the at least one component of the communication device.

3. The communication device of claim 1, wherein the host processor is further configured to power down the interface in response to receipt of the information on the reduced activity state of the modem.

4. The communication device of claim 1, wherein the at least one component of the communication device comprises a hardware component and/or a software component.

5. The communication device of claim 1, wherein the RRC state of the modem is an RRC connected state of the modem.

6. The communication device of claim 1, wherein the communication device is a mobile radio communication device.

7. A method of data communication between a host and a modem interconnected by an interface, the method comprising:
   controlling, by a host processor of the host, one or more components of a communication device;
   communicating, by the host processor, with the modem via the interface;
   controlling, by a modem processor of the modem, one or more components of the modem;
   communicating, by the modem processor, with the host via the interface;
   identifying, by the modem processor, a reduced activity state of the modem;
   determining, by the modem processor, a projected expiration of a reduced activity period of the modem, based on a time remaining until a next event of the modem;
   communicating, by the modem processor, information on the reduced activity state of the modem to the host processor;
   communicating, by the modem processor, the time remaining until the next event of the modem to the host processor;
   reducing, by the host processor, an operation of at least one component of the communication device in response to receipt of the information on the reduced activity state of the modem and the time remaining until the next event of the modem;
   wherein the reduced activity state of the modem comprises a radio resource control (RRC) state of the modem; and
   wherein the information on the reduced activity state of the modem comprises an indication of the RRC state of the modem.

8. The data communication method of claim 7, further comprising:

reducing, by the host processor, the operation of the at least one component of the communication device during at least part of the reduced activity period of the modem.

9. The data communication method of claim 7, further comprising:
powering down the interface, by the host processor, in response to receipt of the information on the reduced activity state of the modem.

10. The data communication method of claim 7, wherein the operation of the at least one component of the communication device is at least partially implemented in hardware and/or partially implemented in software.

11. The data communication method of claim 7, wherein the RRC state of the modem is an RRC connected mode discontinuous reception (cDRX) state of the modem.

12. The data communication method of claim 7, wherein the host and the modem operate in a mobile radio communication device.

13. A communication device, comprising:
a host; and
a modem coupled to the host;
wherein the host comprises:
a host circuit configured to:
control at least one other circuit of the communication device and
communicate with the modem;
wherein the modem comprises:
a modem circuit configured to:
control at least one other circuit of the modem and
communicate with the host;
wherein the modem circuit is further configured to:
identify a reduced activity state of the modem,
determine a projected expiration of a reduced activity period of the modem, based on a time remaining until a scheduled event of the modem,
generate information about the reduced activity state of the modem for communication to the host circuit, and
generate information about the time remaining until the scheduled event of the modem for communication to the host circuit;
wherein the host circuit is further configured to reduce an operation of at least one circuit of the communication device based on receipt of the information about the reduced activity state of the modem and the information about the time remaining until the scheduled event of the modem;
wherein the reduced activity state of the modem comprises a radio resource control (RRC) state of the modem; and
wherein the information about the reduced activity state of the modem comprises an indication of the RRC state of the modem.

14. The communication device of claim 13,
wherein the host circuit is further configured to reduce, during at least part of the reduced activity period of the modem, the operation of the at least one circuit of the communication device.

15. The communication device of claim 13, further comprising:
a communication interface configured to provide a communication between the host and the modem;
wherein the host circuit is further configured to power down the communication interface between the host and the modem in response to receipt of the information about the reduced activity state of the modem.

16. The communication device of claim 13,
wherein the at least one circuit of the communication device is implemented in hardware and/or software.

17. The communication device of claim 13,
wherein the RRC state of the modem is an RRC idle state of the modem.

18. The communication device of claim 13,
wherein the communication device is a mobile radio communication device.

19. A communication device, comprising:
a host system and modem system interconnected by an interface;
wherein the host system comprises:
host processing means for:
controlling components of the communication device and
communicating with the modem system via the interface;
wherein the modem system comprises:
modem processing means for:
controlling one or more components of the modem system and
communicating with the host system via the interface;
wherein the modem processing means is configured to:
identify a reduced activity state of the modem system,
determine a projected expiration of a reduced activity period of the modem system, based on a time remaining until a next event of the modem system,
communicate information on the reduced activity state of the modem system to the host processing means, and
communicate the time remaining until the next event of the modem system to the host processing means;
wherein the host processing means is configured to reduce an operation of at least one component of the communication device based on receipt of the information on the reduced activity state of the modem system, the time remaining until the next event of the modem system, and a wake up delay;
wherein the reduced activity state of the modem system comprises a radio resource control (RRC) state of the modem system; and
wherein the information on the reduced activity state of the modem system comprises an indication of the RRC state of the modem system.

20. The communication device of claim 19,
wherein the host processing means is further configured to reduce, during at least part of the reduced activity period of the modem system, the operation of the at least one component of the communication device.

21. The communication device of claim 19,
wherein the host processing means is configured to power down the interface between the host system and the modem system in response to receipt of the information on reduced activity state of the modem system.

22. The communication device of claim 19,
wherein the at least one component of the communication device comprises a hardware component and/or a software component.

23. The communication device of claim 19,
wherein the RRC state of the modem system is an RRC connected mode discontinuous reception (cDRX) state of the modem system or an RRC idle state of the modem system.

24. The communication device of claim 19,
wherein the communication device is a mobile radio communication device.

\* \* \* \* \*